(12) United States Patent
Vora et al.

(10) Patent No.: US 10,953,871 B2
(45) Date of Patent: Mar. 23, 2021

(54) TRANSPORTATION INFRASTRUCTURE COMMUNICATION AND CONTROL

(71) Applicant: Ford Global Technologies, LLC, Dearborn, MI (US)

(72) Inventors: Ankit Girish Vora, Dearborn, MI (US); Helen Elizabeth Kourous-Harrigan, Monroe, MI (US); Jeffrey Thomas Remillard, Ypsilanti, MI (US); Lu Xu, Dearborn, MI (US); Linjun Zhang, Canton, MI (US); Codrin Cionca, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 16/018,145

(22) Filed: Jun. 26, 2018

(65) Prior Publication Data

US 2019/0389456 A1    Dec. 26, 2019

(51) Int. Cl.
    *B60W 30/09*    (2012.01)
    *B60W 30/095*    (2012.01)
    *G06K 9/00*    (2006.01)

(52) U.S. Cl.
CPC ........ *B60W 30/09* (2013.01); *B60W 30/0953* (2013.01); *B60W 30/0956* (2013.01); *G06K 9/00805* (2013.01); *G06K 9/00825* (2013.01); *B60W 2520/10* (2013.01); *B60W 2554/00* (2020.02); *B60W 2554/801* (2020.02); *B60W 2554/804* (2020.02)

(58) Field of Classification Search
CPC ............. B60W 30/09; B60W 30/0953; B60W 30/0956; G06K 9/00805; G06K 9/00825
See application file for complete search history.

(56) References Cited

U.S. PATENT DOCUMENTS

| | | | |
|---|---|---|---|
| 6,950,789 B2 | 9/2005 | Laird et al. | |
| 8,520,695 B1* | 8/2013 | Rubin | G01C 21/26 370/445 |
| 10,373,490 B2* | 8/2019 | Lee | G08G 1/091 |
| 10,634,782 B2* | 4/2020 | Kawanishi | B60W 30/095 |
| 2002/0105423 A1* | 8/2002 | Rast | G08G 1/162 340/479 |
| 2004/0233048 A1* | 11/2004 | Luna | G08G 1/166 340/435 |

(Continued)

FOREIGN PATENT DOCUMENTS

| | | |
|---|---|---|
| CA | 2290032 A1 | 5/2001 |
| CN | 101783072 A | 7/2010 |

(Continued)

OTHER PUBLICATIONS

Axxonsoft Integrated Security Solutions, "License Plate Recognition—Speeding Violations", retrieved from the Internet URL: https://www.axxonsoft.com/integrated_security_solutions/lpr/speed_control.php (3 pages).

(Continued)

*Primary Examiner* — Behrang Badii
*Assistant Examiner* — Daniel L Greene
(74) *Attorney, Agent, or Firm* — Frank A. MacKenzie; Bejin Bieneman PLC (57) ABSTRACT

In a computer mounted to a stationary support structure a vehicle and an object proximate to the support structure can be detected from data from a sensor mounted to the support structure. A risk condition can be identified based on the detected vehicle and object.

20 Claims, 3 Drawing Sheets

(56) References Cited

U.S. PATENT DOCUMENTS

| | | | |
|---|---|---|---|
| 2005/0257748 A1* | 11/2005 | Kriesel | A01K 29/00 119/51.02 |
| 2012/0200431 A1 | 8/2012 | Ross | |
| 2017/0113664 A1 | 4/2017 | Nix | |
| 2017/0243485 A1* | 8/2017 | Rubin | H04L 67/12 |
| 2017/0251541 A1* | 8/2017 | Cavalcanti | G06Q 30/04 |
| 2017/0287332 A1* | 10/2017 | Ranninger Hernandez | B60W 30/09 |
| 2018/0075309 A1* | 3/2018 | Sathyanarayana | G05D 1/0055 |
| 2018/0217603 A1* | 8/2018 | Kwon | H04L 67/12 |
| 2019/0047581 A1* | 2/2019 | Bai | B60W 50/0098 |

FOREIGN PATENT DOCUMENTS

| | | |
|---|---|---|
| CN | 203825818 U | 9/2014 |
| KR | 101145896 B1 | 5/2012 |
| KR | 20160103459 A | 9/2016 |
| KR | 101671428 B1 | 11/2016 |

OTHER PUBLICATIONS

Axxonsoft Integrated Security Solutions, "License Plate Recognition—Speeding Violations", retrieved from the Internet URL: https://www.axxonsoft.com/integrated_security_solutions/lpr/speed_control.php (3 pages), dated Sep. 14, 2015.

Non-Final Office Action for related matter, U.S. Appl. No. 16/018,144, as issued by the USPTO dated Jun. 1, 2020.

Final Office Action for related U.S. Appl. No. 16/018,144 as issued by the USPTO dated Nov. 13, 2020.

\* cited by examiner

TRANSPORTATION INFRASTRUCTURE COMMUNICATION AND CONTROL

BACKGROUND

Control of road traffic and/or reaction to events such as infrastructure issues (e.g., a defective bridge), accidents, natural disasters, etc. may depend on information about such conditions. For example, an emergency response center computer may receive sensor data from cameras or other types of sensors mounted to the infrastructure, e.g., mounted at intersections, bridges, tunnels, etc.

DETAILED DESCRIPTION

Introduction

Disclosed is a system, comprising a stationary support structure; and a sensor and a computer, each mounted to the support structure; wherein the computer is programmed to detect a vehicle and an object proximate to the support structure from data from the sensor, and to identify a risk condition based on the detected vehicle and object.

The system can include the computer programmed to send an instruction to the vehicle based on the risk condition.

The system can include the computer programmed to identify the risk condition further based on a distance between the detected vehicle and the object.

The system can include the computer programmed to identify the risk condition further based on a classification of the object.

The system can include the computer programmed to identify the risk condition further based on a speed of the vehicle.

The system can include the computer programmed to identify the risk condition further based on a speed of the object.

The system can further comprise a second sensor, wherein the sensor and the second sensor include a camera and a lidar.

The system can include the computer programmed to detect the vehicle and the object proximate to the support structure from data from the sensor and the second sensor.

The system can include that the detected object is a stationary object.

The system can include that the detected object is a mobile object.

A method comprises in a computer mounted to a stationary support structure detecting a vehicle and an object proximate to the support structure from data from a sensor mounted to the support structure; and identifying a risk condition based on the detected vehicle and object.

The method can further comprise sending an instruction to the vehicle based on the risk condition.

The method can further comprise identifying the risk condition further based on a distance between the detected vehicle and the object.

The method can further comprise identifying the risk condition further based on a classification of the object.

The method can further comprise identifying the risk condition further based on a speed of the vehicle.

The method can further comprise identifying the risk condition further based on a speed of the object.

The method can further include that a second sensor is mounted to the support structure, wherein the sensor and the second sensor include a camera and a lidar.

The method can further comprise detecting the vehicle and the object proximate to the support structure from data from the sensor and the second sensor.

The method can further include that the detected object is a stationary object.

The method can further include that the detected object is a mobile object.

Exemplary System Elements

A stationary support structure can support various components, such as sensors and a computer, mounted thereto (e.g., with various mounting mechanisms, housings, etc.). The computer can be programmed to receive data from one or more sensors mounted to the support structure and/or from one or more vehicles proximate to the support structure. Based on the received data, the computer can determine one or more physical attributes of objects and/or vehicles proximate to the support structure. By evaluating a location and/or trajectory of a vehicle and one or more objects (which could include one or more other vehicles), the infrastructure computer can identify risk scenarios and/or traffic violations, and can instruct actions based thereon.

Figure 1:
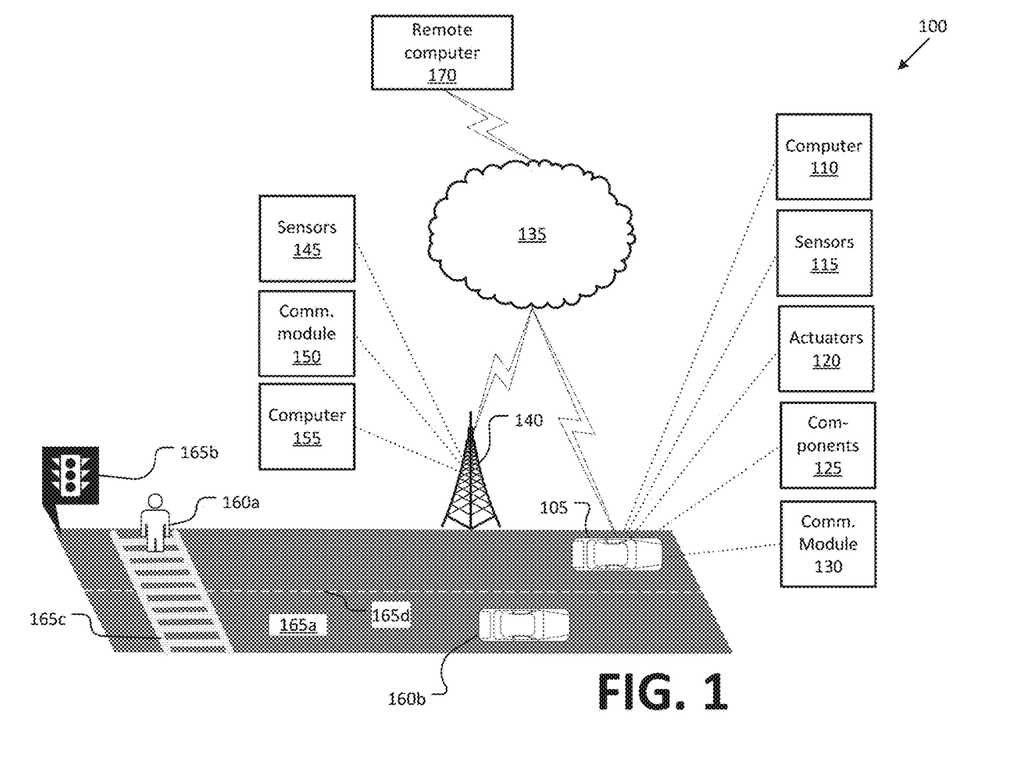
FIG. 1 is a diagram illustrating an example infrastructure communications and control system.

FIG. 1 is a block diagram of an example infrastructure communications and control system (or infrastructure system) 100. The system 100 includes a vehicle 105, which is a land vehicle such as a car, truck, etc. Additionally or alternatively, the vehicle 105 may include a bicycle, a motorcycle, etc. The vehicle 105 includes a vehicle computer 110, sensors 115, actuators 120 to actuate various vehicle components 125, and a vehicle communications module 130. Via a network 135, the communications module 130 allows the vehicle computer 110 to communicate with one or more data collection or infrastructure nodes 140 and a central server 170.

The computer 110 includes a processor and a memory such as are known. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 105 network, the computer 110 may transmit messages to various devices in the vehicle and/or receive messages from the various devices, e.g., sensors 115, an actuator 120, an human machine interface (HMI), etc. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to an infrastructure node 140 (typically via direct radio frequency communications) and/or (typically via the network 135) a remote server 170. The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 105 may communicate with an infrastructure node 140 and/or central server 170. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure node 140 includes a physical structure such as a tower or other support structure (e.g., a pole, a box mountable to a bridge support, cell phone tower, road sign support, etc.) on which infrastructure sensors 145, as well as an infrastructure communications module 150 and computer 155 can be mounted, stored, and/or contained, and powered, etc. One infrastructure node 140 is shown in FIG. 1 for ease of illustration, but the system 100 could and likely would include tens, hundreds, or thousands of nodes 140. The infrastructure node 140 is typically stationary, i.e., fixed to and not able to move from a specific geographic location. The infrastructure sensors 145 may include one or more sensors such as described above for the vehicle 105 sensors 115, e.g., lidar, radar, cameras, ultrasonic sensors, etc. The infrastructure sensors 145 are fixed or stationary. That is, each sensor 145 is mounted to the infrastructure node so as to have a substantially unmoving and unchanging field of view.

Sensors 145 thus provide field of views in contrast to vehicle 105 sensors 115 in a number of advantageous respects. First, because sensors 145 have a substantially constant field of view, determinations of vehicle 105 and object 160, 165 locations can be accomplished with fewer and simpler processing resources than if movement of the sensors 145 also had to be accounted for. Further, the sensors 145 include an external perspective of the vehicle 145 and can sometimes detect features and characteristics of objects 160, 165 not in the vehicle 105 sensors 115 field(s) of view and/or can provide more accurate detection, e.g., with respect to vehicle 105 location and/or movement with respect to other objects 160, 165. Yet further, sensors 145 can communicate with the node 140 computer 155 via a wired connection, whereas vehicles 105 typically can communicates with nodes 140 and/or a server 170 only wirelessly, or only at very limited times when a wired connection is available. Wired communications are more reliable and can be faster than wireless communications such as vehicle-to-infrastructure communications or the like.

The communications module 150 and computer 155 typically have features in common with the vehicle computer 110 and vehicle communications module 130, and therefore will not be described further to avoid redundancy. Although not shown for ease of illustration, the infrastructure node 140 also includes a power source such as a battery, solar power cells, and/or a connection to a power grid.

An infrastructure node 140 can be provided to monitor one or more mobile objects 160. An "object", in the context of this disclosure, is a physical, i.e., material, structure detected by a sensor 115 and/or 145. A "mobile" object 160 is an object that is capable of moving, even though the mobile object 160 may or not be actually moving at any given time. The mobile object 160 is generally proximate to the node 140 for only a relatively brief period of time, e.g., at most two to three minutes. (In the present context, "proximate" means that the object 160 is within a field of view of one or more node 140 sensors 145.) The "mobile" object 160 is so designated for convenience to distinguish from fixed or infrastructure objects 165, discussed further below. Example mobile objects 160 an animal (e.g., human) object 160*a*, a vehicle 160*b* (and/or, as should be readily apparent, the vehicle 105 can qualify as an object 160, hence the vehicle 105 may also be referred as an object 105), a bicycle, rocks and/or other debris, etc.

The node 140 can monitor physical features of objects 160, i.e., the node computer 155 can receive and analyze data from sensors 145 substantially continuously, periodically, and/or when instructed by a server 170, etc. A physical feature in this context is a physical attribute or characteristic of an object 160, such as a speed, direction, topography of a surface area (e.g., is it bumpy or smooth, potholed, etc.), a material covering the object 160, e.g., asphalt or gravel, or a state of damage such as flooding or debris from an avalanche or rock slide. Further, conventional object classification or identification techniques can be used, e.g., in the computer 155 based on lidar sensor 145, camera sensor 145, etc., data, to identify a type of object, e.g., vehicle, person, rock, bicycle, motorcycle, etc.

An infrastructure object 165, as mentioned above, is an object that, typically by design, is fixed and/or remains stationary with respect to the node 140. For example, infrastructure objects 165 can include a road 165*a*, a traffic light 165*b*, a crosswalk 165*c*, a road marking 165*d*, etc. Infrastructure objects 165 often are provided to govern or guide pedestrian and/or vehicular traffic, e.g., a traffic light regulates the passage of pedestrians and/vehicles 105, 160*b* at various locations, e.g., an intersection, on a road 165*a*.

The server 170 can be a conventional computing device, i.e., including one or more processors and one or more memories, programmed to provide operations such as disclosed herein. Further, the server 170 can be accessed via the network 135, e.g., the Internet or some other wide area network.

Figure 2:
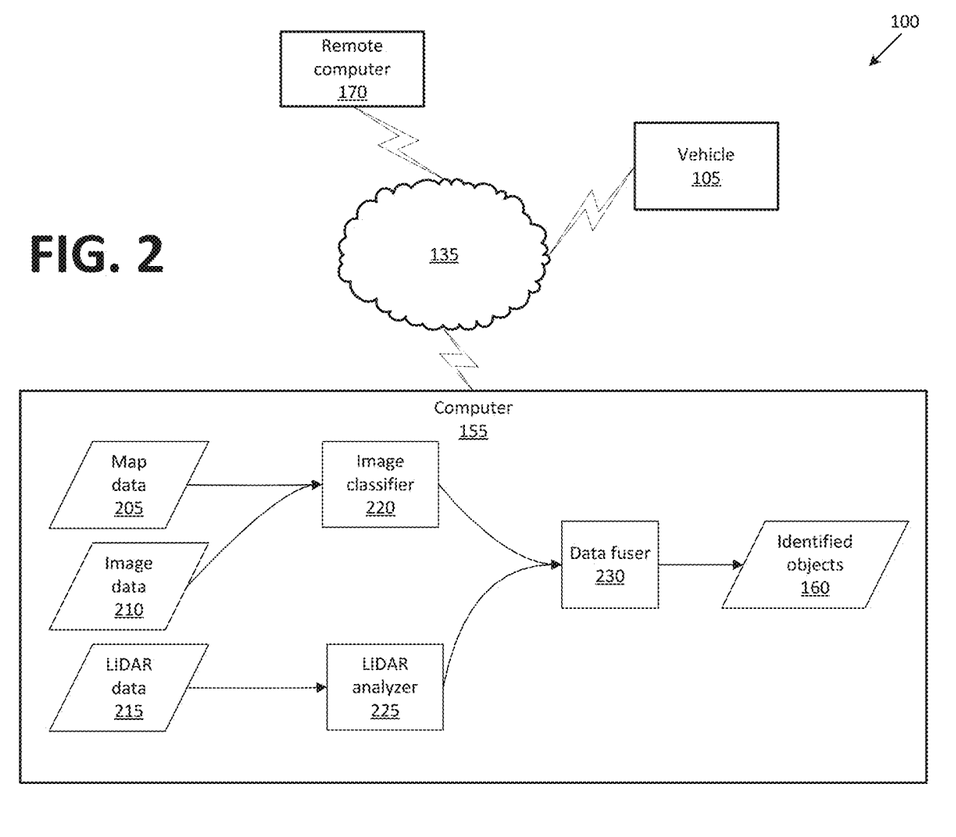
FIG. 2 is a block diagram illustrating processing in an infrastructure node computer.

FIG. 2 is a block diagram illustrating processing in an infrastructure node computer 155.

An infrastructure node 140 computer 155 can include a memory or other storage with map data 205 describing an area (e.g., within a predetermined radius such as 100 meters, 200 meters, etc.) around the node 140. For example, such map data 205 could be received and/or periodically updated from a central server 170, by a technician servicing the node 140, etc. Map data 205 typically includes geo-coordinates defining fixed or stationary objects 165, e.g., a road 165*a*, a stoplight 165*b*, a crosswalk 165*c*, etc.

Further, the computer 155 can receive various data from the node 140 sensors 145 as well as, e.g., via V2X communications, from vehicle 105 sensors 115. Image data 210 is digital image data, e.g., comprising pixels with intensity and color values, can be acquired by a camera sensors 115, 145. LIDAR data 215 typically includes conventional LIDAR point cloud data acquired by lidar sensors 115, 145, i.e., including data describing points in three dimensions, that is, each point representing a location of a surface of an object 160, 165, 105.

Map data 205 and image data 210 can be provided to a classifier 220. The classifier 220 comprises programming to utilize one or more conventional image classification techniques. For example, the classifier can use a machine learning technique in which images 210 of various objects 160 and physical features thereof, can be provided to a machine learning program for training the classifier 220. Training images 210 can be provided from a plurality of nodes 140, from images gathered by vehicles 105, or other sources. Once trained, the classifier 220 can accept as input an image 210 and then provide as output, for each of one or more respective regions of interest in the image 210, an indication of one or more objects 160 or an indication that no object 160 is present in the respective region of interest.

Map data 205 is used to specify the region of interest in an image 210. For example, map data 205 may specify geo-coordinates or the like for various physical features of infrastructure objects 165 proximate to the node 140 (i.e., within a field of view of node 140 sensors 145), i.e., in a field of view of a sensor 145 such as a camera sensor 145 mounted or attached to the node 140. Programming of the classifier 220 or otherwise included in the computer 155 can determine a region of interest in an image 210 according to geo-coordinates specified in map data 205. That is, geo-coordinates in map data 205 can be mapped or associated to Cartesian or polar coordinates in an image sensor 145 field-of-view. The classifier 220 can identify coordinates in an image 210 representing a region of interest based on geo-coordinates in map data 205 e.g., a field of view of one or more sensors 145 or a subset thereof, e.g., a predefined area proximate to the node 145, e.g., a crosswalk 165*c* and an area of a road 165*a* including the crosswalk 165*c*, such as ten meters of road 165*a* in either direction of the crosswalk 165*c*. The region of interest can then be analyzed by the classifier 220 according to conventional image classification and/or object recognition techniques. Accordingly, the classifier 220 can output identification of one or more objects 160 with respective geo-coordinates, i.e., according to map data 205, of each identified object 160.

Data fuser 230 comprises further programming in the computer 155. The data fuser includes programming to accept as input a first set of one or more objects 160 identified by the image classifier 220 and a second set of one or more objects 160 identified by the lidar analyzer 225. The data fuser 230 can output a third set of one or more identified objects 160. The set of identified objects 160 could be provided in the form of a list, a table, or the like, where each object 160 in the set is identified by an identifier and/or description, e.g., "pedestrian (or person)" "vehicle," "bicycle," etc., along with a set of geo-coordinates identifying a location or locations of the respective object 160. For example, the geo-coordinates could specify a center or reference point, e.g., for an object 160.

Further, object features can be determined from sensor 145 data once an object is identified. For example, an object 160 trajectory can be determined, e.g., using conventional techniques to track an object 160 according to LIDAR sensor 145 data. Alternatively or additionally, as noted above, an object 160 location can be determined, e.g., with reference to map data 205.

Identified objects 160 can be determined by the following processing by the data fuser 230. Specifically, the data fuser 230 can compare each object 160 identified in the first set to each object 160 identified in the second set to determine if a combined confidence in an object 160 identified by image data 210 and lidar data 215 warrants a conclusion that the object 160 can be identified. For example, conventional image classification and lidar data analysis techniques may be used in the image classifier 220 and lidar analyzer 225, respectively, to assign a confidence level, e.g., a number between or including zero and one, to each predicted object 160. When a combination of the confidences of object 160 predictions from the image classifier 220 and the lidar analyzer 225 meets or exceeds a threshold, then the object 160 may be included in the feature conditions 235 output from the data fuser 230. In one example, an object 160 may be included in the conditions 235 if either the image classifier 220 or the lidar analyzer 225 predict the an object 160 with a confidence above a predetermined threshold, e.g., 0.9 or 90%.

Figure 3:
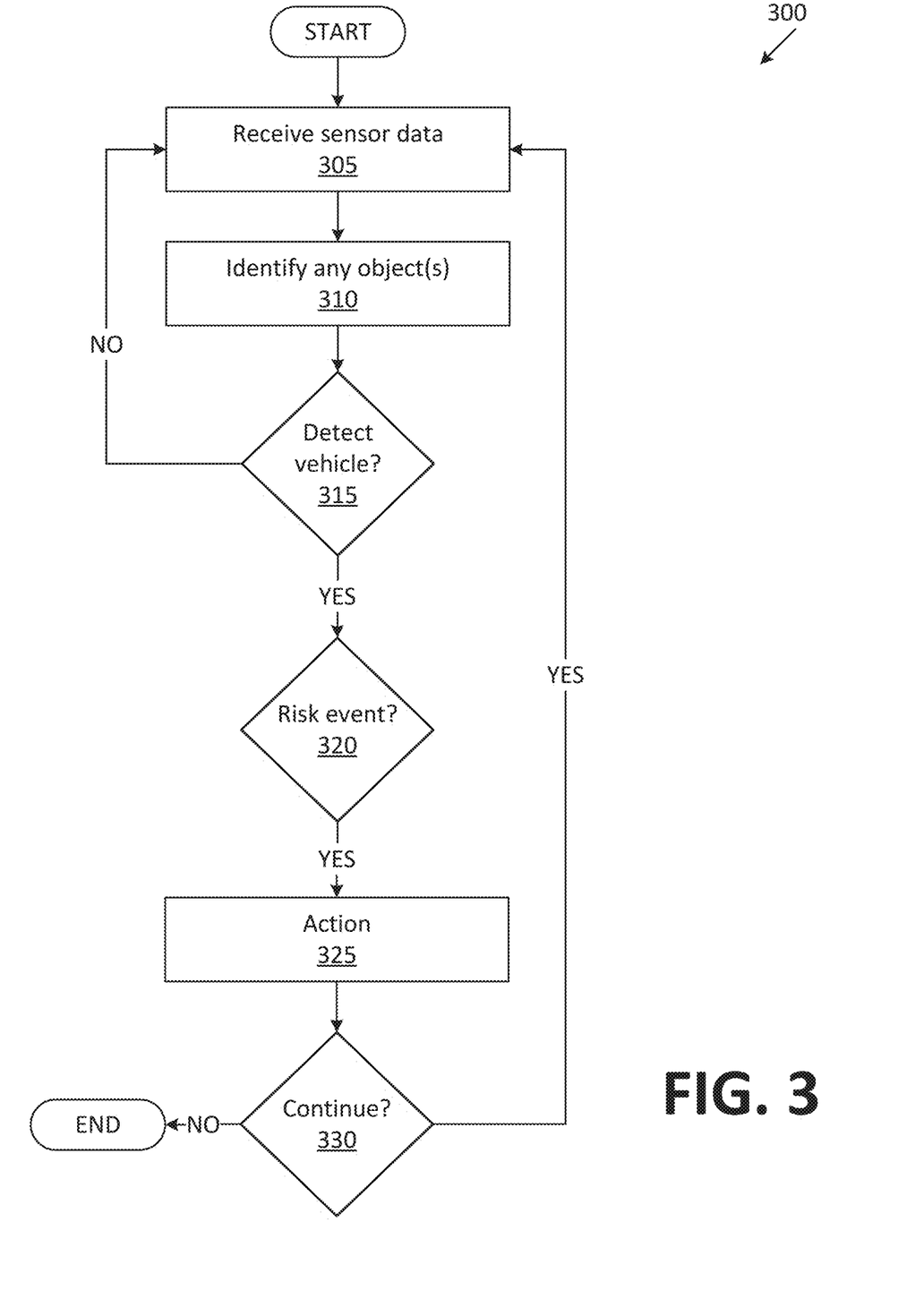
FIG. 3 is a flowchart of an exemplary process for processing an infrastructure node's sensor data.

FIG. 3 is a flowchart of an exemplary process 300 for processing infrastructure node 140 sensor 145 data to identify a vehicle 105 risk event and take action based thereon. The process 300, blocks of which can be executed in an order different than that described herein and/or can be executed in combination with other processing, and/or by omitting certain processing described herein, can be executed by programming in a node 140 computer 155.

The process 300 begins in a block 305, in which the computer 155 receives sensor 145 data, e.g., image data 210 and/or lidar data 215. Further, the computer 155 could receive map data 205, e.g., from a remote computer 170, in the block 305, but also could receive the map data 205 outside of the process 300, e.g., by periodic download from the remote computer 170. Moreover, receipt of sensor 145 data in the computer 155 could be performed substantially continuously, or alternatively could be performed on a periodic basis, e.g., every five minutes, every hour, etc. Yet further, a message from a remote computer 170 or some other device via the network 135 could trigger or instruct the computer 155 to obtain sensor 145 data. Yet further, the computer 155 could receive data from a vehicle 105 and/or one or more second vehicles, e.g., vehicle 105 sensor 115 data or other data from a vehicle 105, e.g., data describing a speed, heading, etc. of the vehicle 105.

Next, the process 300 proceeds to a block 310. In the block 310, the computer 155 utilizes the image classifier 220, lidar analyzer 225, and data fuser 230 to generate a set of identified objects 160, as described above, and then determines whether any vehicles 105 are proximate to the node 140, e.g., which means that the vehicle(s) 105 is/are within a field of sensor(s) 145 and have been detected and included in the identified objects 160. Note that multiple vehicles 105 could be identified, in which case the process 300 could continue separately, e.g., with separate process threads, for each of the identified vehicles 105.

Typically, for each identified vehicle 105 in the block 310, the computer 155 stores identifying indicia, i.e., data that can be used to identify the vehicle 105. In some instances, sensor data 145 can provide an image of a vehicle 105 license plate or tag from which a license plate number or the like can be identified, e.g., using conventional image analysis techniques. However, alternatively or additionally, e.g., if a unique identifying indicia is not available, the computer 155 can store an image of the vehicle 105 for later identification. For example, the image could be transmitted to the server 170 for review and analysis. Yet further alternatively or additionally, the vehicle 105 could transmit, e.g., according to Dedicated Short Range Communications or some other wireless communications, an identifier to the node 140.

Next, in a decision block 315, the computer 155 determines whether a vehicle 105 has been detected as described above concerning the block 310. If not, the process 300 returns to the block 305 (or alternatively, although not shown in FIG. 3, the process 300 could end). Further, implementations are possible in which, even if a vehicle 105 is not detected, node 140 sensors 145 collect data concerning abject 160, including possibly other vehicles, to provide warning and actions relating to possible risk events. In any event, if a vehicle 105 is detected, then the process 300 proceeds to a block 320.

Next, in the decision block 320, the computer 155 determines whether one or more risk events are identified. Risk events can be identified according to one or more physical conditions or attributes of a vehicle 105 and/or object(s) 160 identified by a node 140 computer 155. A physical condition in this context is a description of a physical property of a mobile object 160 and/or vehicle 105 that can be measured and quantified, e.g., a vehicle 105 velocity or speed ("velocity" having the common meaning of a vector that includes speed, i.e., velocity includes speed and also a directional component), an object 160 location, a vehicle 105 distance from a mobile object 160, etc. Accordingly, a risk event is determined by evaluating a combination of criteria that can include a vehicle 105 location and/or velocity (including whether a vehicle 105 is moving or stationary, i.e., vehicle 105 velocity is zero), a mobile object 160 location and/or velocity, a mobile object 160 classification, an infrastructure object 165 location, an infrastructure object 165 classification, etc. The computer 155 evaluates the criteria to determine if one or more conditions are met for one or more risk events. Typically, a risk event is determined by evaluating a vehicle location and/or velocity. Further, in addition to evaluating a vehicle location and/or velocity, determining a risk event typically includes evaluating a location and/or velocity of a mobile object 160 and/or a location of an infrastructure object 165, wherein at least one criterion for determining a risk event is that a distance between the vehicle 105 and an object 160 or 165 is less than a predetermined distance specified as defining at least in part the risk event.

For example, the computer 155 could evaluate a location and/or trajectory of a vehicle 105 and/or mobile object 160 with respect to a vehicle 105 to determine to assign a risk event to the vehicle 105. If the vehicle 105 is within a predetermined distance of the object 160, e.g., the vehicle 105 is too close to a pedestrian 160a, a risk event can be identified. The computer 155 could store a table or the like associating various physical features or conditions of a vehicle 105 to various risk events, i.e., conditions of the vehicle 105 that, possibly in combination with conditions of an object 160, determine a risk event. For example, a risk event could be indicated when a vehicle 105 is within a predetermined distance of a pedestrian 160a, stops for a traffic light 165b within a predetermined distance of, or on, a crosswalk 165c, is within a predetermined distance of and/or crosses a road 165a marking such as a centerline 165d, proceeds in a specified lane (e.g., a road 165a shoulder) at above a specified velocity for traveling in the specified lane, etc. Table 1 below provides just a few of many possible examples of risk events that could be identified based on physical features of mobile objects 160 and/or infrastructure objects 165.

TABLE 1

| Detected Physical Condition(s) | Risk Event(s) |
| --- | --- |
| Vehicle stops on or within predetermined distance (e.g., 1 meter) of crosswalk | Crosswalk violation |
| Vehicle enters crosswalk while pedestrian is in crosswalk | Crosswalk violation, pedestrian endangerment |
| Vehicle crosses road centerline and/or shoulder marking | Reckless driving |
| Vehicle moves and/or stops within predetermined distance (e.g., 1 meter) of pedestrian | Crosswalk violation, pedestrian endangerment |

If no risk event is detected, the process 300 returns to the block 305 (or, although not shown, could alternatively end). Otherwise, a block 325 is executed next.

In the block 325, the computer 155 executes one or more actions based on the identified risk event. The one or more actions could include sending a message to the server 170 specifying the vehicle (e.g., providing an image of a license plate and/or other identifying information. The remote server 170 could then report the vehicle 105 risk event, e.g., to law enforcement. The one or more actions could alternatively or additionally include sending a control instruction to a vehicle 105 from the node 140, e.g., to adjust a rate of speed (e.g., slow to no more than 5 or 10 kilometers per hour) until at least a predetermined distance (e.g., fifty meters) from a crosswalk 165c or other infrastructure element, to adjust a rate of speed (e.g., slow to no more than 5 or 10 kilometers per hour) while in a lane that is a road shoulder and/or immediately adjacent to a pedestrian walkway, to come to a stop by a side of a road 165a, e.g., because a speed and/or distance proximate to an object 160 such as a pedestrian 160 is above and/or below respective thresholds, etc. The node 140 could send a message to a vehicle 105 via vehicle-to-infrastructure mechanisms, e.g., a wireless message identifying a vehicle by license number or the identifier, and further including the instruction.

Following the block 325, the process 300 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a stationary support structure; and
   a sensor and a computer, each mounted to the support structure;
   wherein the computer is programmed to detect a vehicle and an object proximate to the support structure from data from the sensor mounted to the support structure, and to identify a risk event based on a location and velocity of the detected vehicle, a location and velocity of the detected object, and a classification of the object.

2. The system of claim 1, wherein the computer is further programmed to send an instruction to the vehicle to adjust a vehicle speed based on the risk event.

3. The system of claim 1, wherein the computer is programmed to identify the risk event further based on a distance between the detected vehicle and the object.

4. The system of claim 1, wherein the computer is programmed to identify the risk event further based on a location of the support structure.

5. The system of claim 1, wherein the computer is programmed to identify the risk event further based on a speed of the vehicle.

6. The system of claim 1, wherein the computer is programmed to identify the risk event further based on a speed of the object.

7. The system of claim 1, further comprising a second sensor mounted to the support structure, wherein the sensor and the second sensor include a camera and a lidar.

8. The system of claim 7, wherein the computer is further programmed to detect the vehicle and the object proximate to the support structure from data from the sensor and the second sensor.

9. The system of claim 1, wherein the detected object is a stationary object.

10. The system of claim 1, wherein the detected object is a mobile object.

11. A method, comprising:
    in a computer mounted to a stationary support structure, detecting a vehicle and an object proximate to the support structure from data from a sensor mounted to the support structure; and
    identifying a risk event based on a location and velocity of the detected vehicle, a location and velocity of the detected object, and a classification of the object.

12. The method of claim 11, further comprising sending, from the computer mounted to the support structure, an instruction to the vehicle to adjust a vehicle speed based on the risk event.

13. The method of claim 11, further comprising identifying the risk event further based on a distance between the detected vehicle and the object.

14. The method of claim 11, further comprising identifying the risk event further based on a location of the support structure.

15. The method of claim 11, further comprising identifying the risk event further based on a speed of the vehicle.

16. The method of claim 11, further comprising identifying the risk event further based on a speed of the object.

17. The method of claim 11, wherein a second sensor is mounted to the support structure, wherein the sensor and the second sensor include a camera and a lidar.

18. The method of claim 17, further comprising detecting the vehicle and the object proximate to the support structure from data from the sensor and the second sensor.

19. The method of claim 11, wherein the detected object is a stationary object.

20. The method of claim 11, wherein the detected object is a mobile object.

* * * * *